UNITED STATES PATENT OFFICE.

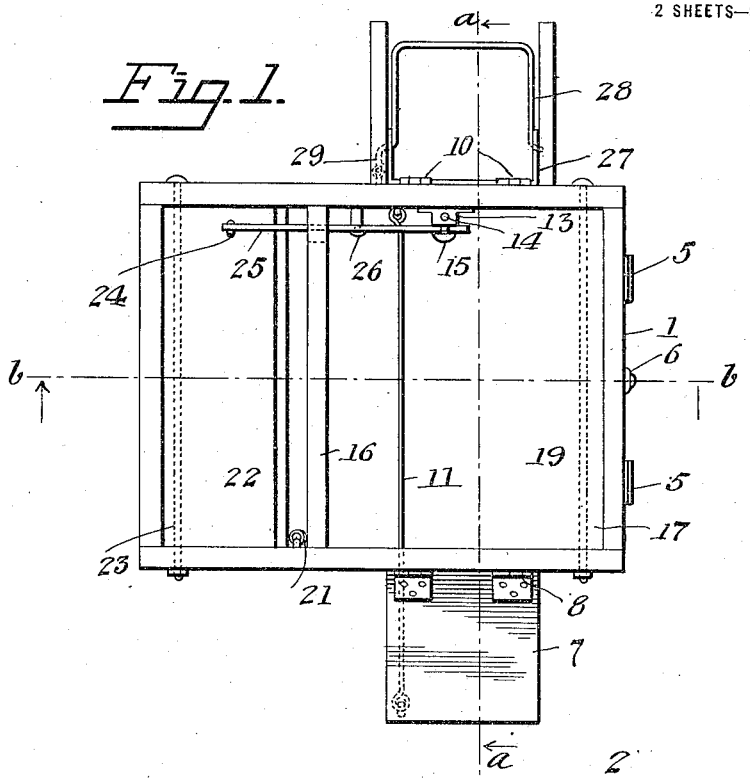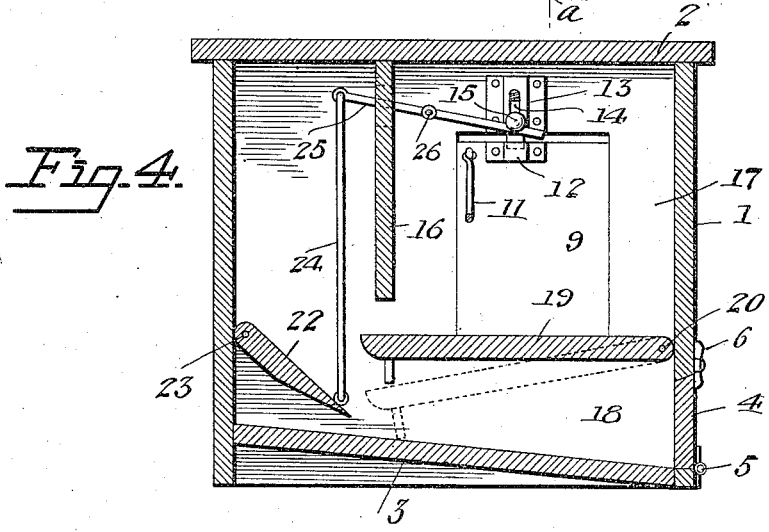

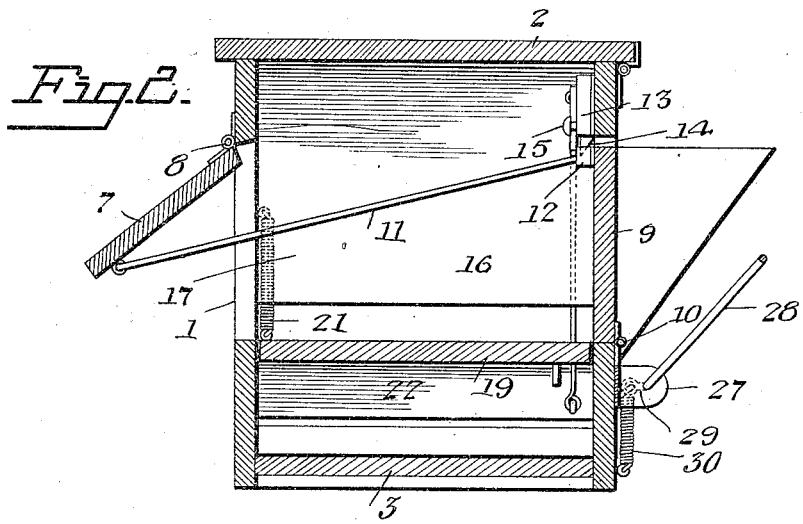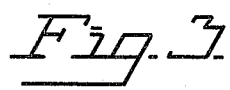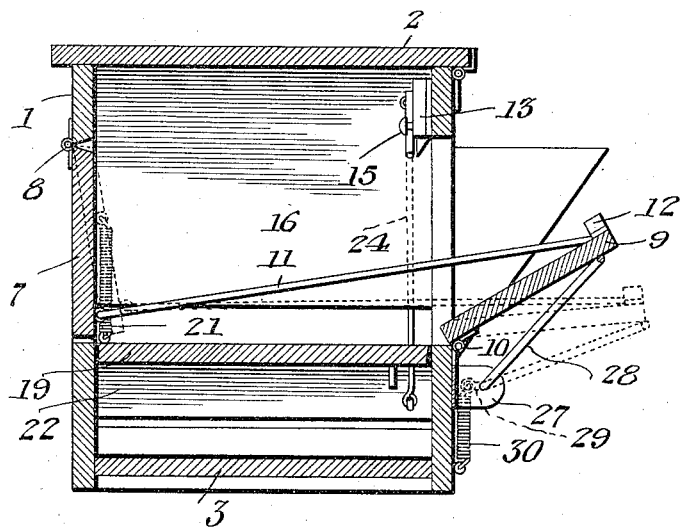

OSCAR J. FORGIT, OF LEICESTER, MASSACHUSETTS.

TRAP-NEST.

1,178,393.  Specification of Letters Patent.  Patented Apr. 4, 1916.

Application filed October 23, 1915. Serial No. 57,520.

*To all whom it may concern:*

Be it known that I, Oscar J. Forgit, a citizen of the United States, residing at Leicester, in the county of Worcester and State of Massachusetts, have invented new and useful Improvements in Trap-Nests, of which the following is a specification.

This invention is an improved trap nest for use by poultrymen to ascertain which hens are laying and to also prevent laying hens from being disturbed while on the nest, the object of the invention being to provide an improved device of this character which is cheap and simple in construction, which operates automatically and which is not likely to get out of order.

The invention consists in the construction, combination and arrangement of devices hereinafter described and claimed.

In the accompanying drawings:—Figure 1 is a plan of a trap nest constructed in accordance with my invention and with the cover removed. Fig. 2 is a vertical sectional view of the same on the plane indicated by the line *a—a* of Fig. 1 and showing the doors in initial position. Fig. 3 is a similar view on the same plane showing the doors in different positions from those shown in Fig. 2. Fig. 4 is a similar view on the plane indicated by the line *b—b* of Fig. 1.

My improved trap nest is a box 1 having a hinged cover 2 and a fixed bottom 3 which is inclined to cause eggs to roll by gravity to an egg door 4 which is here shown as hinged as at 5, a button 6 being employed to secure the egg door in closed position.

In one side wall of the trap is a hinged entrance door 7 the hinges 8 of which are at its upper side and in the side of the trap nest opposite the entrance door is an outlet door 9, the hinges 10 of which are at its lower side. These doors are connected together by a rod 11 so that when one door is closed the other is open. The outlet door has a keeper 12 on its inner side, near its upper end and the corresponding wall of the box or trap has a spring catch 13 for normally engaging the keeper to secure the outlet door in closed position and the inlet door in open position. The bolt 14 of the catch is provided with an operating knob 15.

A partition wall 16 extends between the front and rear walls of the trap nest and is spaced from the bottom thereof and forms in connection with the other walls of the trap nest a nest chamber 17 and an egg receiving chamber 18. The bottom of the nest chamber is formed by a board 19 which is pivotally mounted at the outer side as at 20 and which is normally held in horizontal postion by a spring 21. An egg operated trip 22 is arranged near the bottom of the egg compartment 18, is pivotally mounted at its outer side as at 23 and is connected by a rod 24 to a trip lever 25 which is pivotally mounted as at 26 and the free end of which engages under the knob 15.

The rear side wall of the box or nest is provided at its outer side, below the outlet door 9 with a U-shaped bracket 27 on which is pivotally mounted a U-shaped bail 28. This bail has a crank arm 29 to which a spring 30 is connected. The function of this spring is to normally hold the bail in raised position spaced from the outer side of the outlet door.

The operation of my invention is as follows:—The outlet door being normally closed and the inlet door being normally open a hen enters through the inlet door and while in the nest compartment 17 her weight causes the bottom 19 to tilt against the tension of the spring 21. When an egg is laid it rolls down the inclined bottom 19 and upon the egg trip, depressing the latter so that the egg reaches the inclined bottom 3 and rolls to the front where it can be removed through the door 4. The downward movement of the egg trip causes the latter to raise the trip lever 25, said trip lever releasing the catch from the keeper 12 and thereupon the inlet door closes by its own weight and in so doing swings the outlet door outwardly to a partly open position until it reaches the bail 28. The hen leaves the nest through the outlet door and in doing so necessarily perches thereupon, the weight of the hen depressing the outlet door and the bail, against the tension of the spring 30 and as the hen flies from the outlet door the spring throws the bail back to its initial position and causes the bail to slam the outlet door to normal closed position, thereby reopening the inlet door, the outlet door being snapped and held in its closed position by the catch. By watching the nest all hens which leave it through the outlet door can be identified as laying hens, those which do not lay leaving the trap through the inlet door 7.

Having thus described my invention, I claim:—

1. In a trap nest of the class described a box having a nest chamber and an egg chamber the former provided with oppositely opening inlet and outlet doors connected together for simultaneous movement, a catch to normally secure the outlet door in closed position, an egg trip, a trip to release the catch connected to and operated by the egg trip and a pivotally mounted spring supported bottom in the nest chamber held by the weight of a hen in inclined position to cause an egg to engage and operate the egg trip thereby causing the latter to release the outlet door, said outlet door being hinged at its lower side and said inlet door being hinged at its upper side so that when the outlet door is released the inlet door by its own weight moves to closed position and opens the outlet door.

2. In a trap nest of the class described a box having a nest chamber and an egg chamber the former provided with oppositely opening inlet and outlet doors connected together for simultaneous movement, a catch to normally secure the outlet door in closed position, an egg trip, a trip to release the catch connected to and operated by the egg trip and a pivotally mounted spring supported bottom in the nest chamber held by the weight of a hen in inclined position to cause an egg to engage and operate the egg trip thereby causing the latter to release the outlet door, said outlet door being hinged at its lower side and said inlet door being hinged at its upper side so that when the outlet door is released the inlet door by its own weight moves to closed position and opens the outlet door, a spring operated yielding element put under tension by the weight of a hen while perched on the outlet door and serving when said door is relieved of the weight of the hen to return said outlet door to closed position and thereby reopen the inlet door automatically.

In testimony whereof I affix my signature in presence of two witnesses.

OSCAR J. FORGIT.

Witnesses:
WILLIAM TEBO,
ALFRED L. GANCHER.

Copies of this patent may be obtained for five cents each, by addressing the "Commissioner of Patents, Washington, D. C."